US006930288B1

(12) United States Patent
Lin et al.

(10) Patent No.: US 6,930,288 B1
(45) Date of Patent: Aug. 16, 2005

(54) COOKING DEVICE WITH A WARMING COMPARTMENT

(75) Inventors: Fang-Chuan Lin, Tainan (TW); Ta-Chi Liu, Pan-Chiao (TW); Chia-Chun Lin, Kaohsiung (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/790,354

(22) Filed: Mar. 1, 2004

(51) Int. Cl.[7] .............................. H05B 3/68; A47J 37/10

(52) U.S. Cl. ...................................... 219/450.1; 99/425

(58) Field of Search .......................... 219/443.1, 450.1, 219/452.4, 524; 99/422, 425, 444, 445, 378

(56) References Cited

U.S. PATENT DOCUMENTS

| | | | | |
|---|---|---|---|---|
| 5,355,779 A | * | 10/1994 | O'Brien et al. | ............... 99/446 |
| 5,884,555 A | * | 3/1999 | Chang | ......................... 99/425 |
| 6,472,644 B1 | * | 10/2002 | Wu | ......................... 219/450.1 |

* cited by examiner

Primary Examiner—Sang Y. Paik
(74) Attorney, Agent, or Firm—Ladas & Parry LLP (57) ABSTRACT

A cooking device includes a base plate, a cooking plate mounted on and cooperating with the base plate to define a receiving space therebetween and formed with at least a drain hole in fluid communication with the receiving space, and a partition unit mounted on the base plate within the receiving space and dividing the receiving space into a warming compartment that is adapted to receive food therein so as to warm the food during cooking, and an oil compartment that is isolated from the warming compartment and that is adapted to receive oil, which is formed on the cooking plate as a result of cooking and which is drained through the drain hole in the cooking plate.

11 Claims, 8 Drawing Sheets

COOKING DEVICE WITH A WARMING COMPARTMENT

BACKGROUND OF THE INVENTION

1. Field of the Invention

This invention relates to a cooking device, more particularly to a cooking device with a warming compartment that is adapted to receive food which is to be kept warm therein.

2. Description of the Related Art

Conventional cooking devices, such as portable grill-type cooking devices, normally include a base plate and a cooking plate mounted on the base plate. The conventional cooking devices are disadvantageous in that heat cannot be retained in the food after they are cooked and are removed from the cooking plate, which results in an adverse effect on the taste of the cooked food.

SUMMARY OF THE INVENTION

Therefore, the object of the present invention is to provide a cooking device with a warming compartment that is capable of overcoming the aforesaid drawback of the prior art.

According to the present invention, there is provided a cooking device that includes: a base plate; a cooking plate mounted on and cooperating with the base plate to define a receiving space therebetween and formed with at least a drain hole in fluid communication with the receiving space; and a partition unit mounted on the base plate within the receiving space and dividing the receiving space into a warming compartment that is adapted to receive food therein so as to warm the food during cooking, and an oil compartment that is isolated from the warming compartment and that is adapted to receive oil, which is formed on the cooking plate as a result of cooking and which is drained through the drain hole in the cooking plate.

BRIEF DESCRIPTION OF THE DRAWINGS

In drawings which illustrate embodiments of the invention.

DETAILED DESCRIPTION OF THE PREFERRED EMBODIMENTS

For the sake of brevity, like elements are denoted by the same reference numerals throughout the disclosure.

FIGS. 1 to 5 illustrate the first preferred embodiment of a cooking device according to the present invention. The cooking device includes: a base plate 1; a cooking plate 2 mounted on and cooperating with the base plate 1 to define a receiving space 20 (see FIG. 3) therebetween and formed with at least a drain hole 213 in fluid communication with the receiving space 20; and a partition unit 100 (see FIG. 3) mounted on the base plate 1 within the receiving space 20 and dividing a portion of the receiving space 20 into a warming compartment 313 that is adapted to receive food therein so as to warm the food during cooking, and an oil compartment 411 that is isolated from the warming compartment 313 and that is adapted to receive oil, which is formed on the cooking plate 2 as a result of cooking and which is drained through the drain hole 213 in the cooking plate 2.

Figure 1:
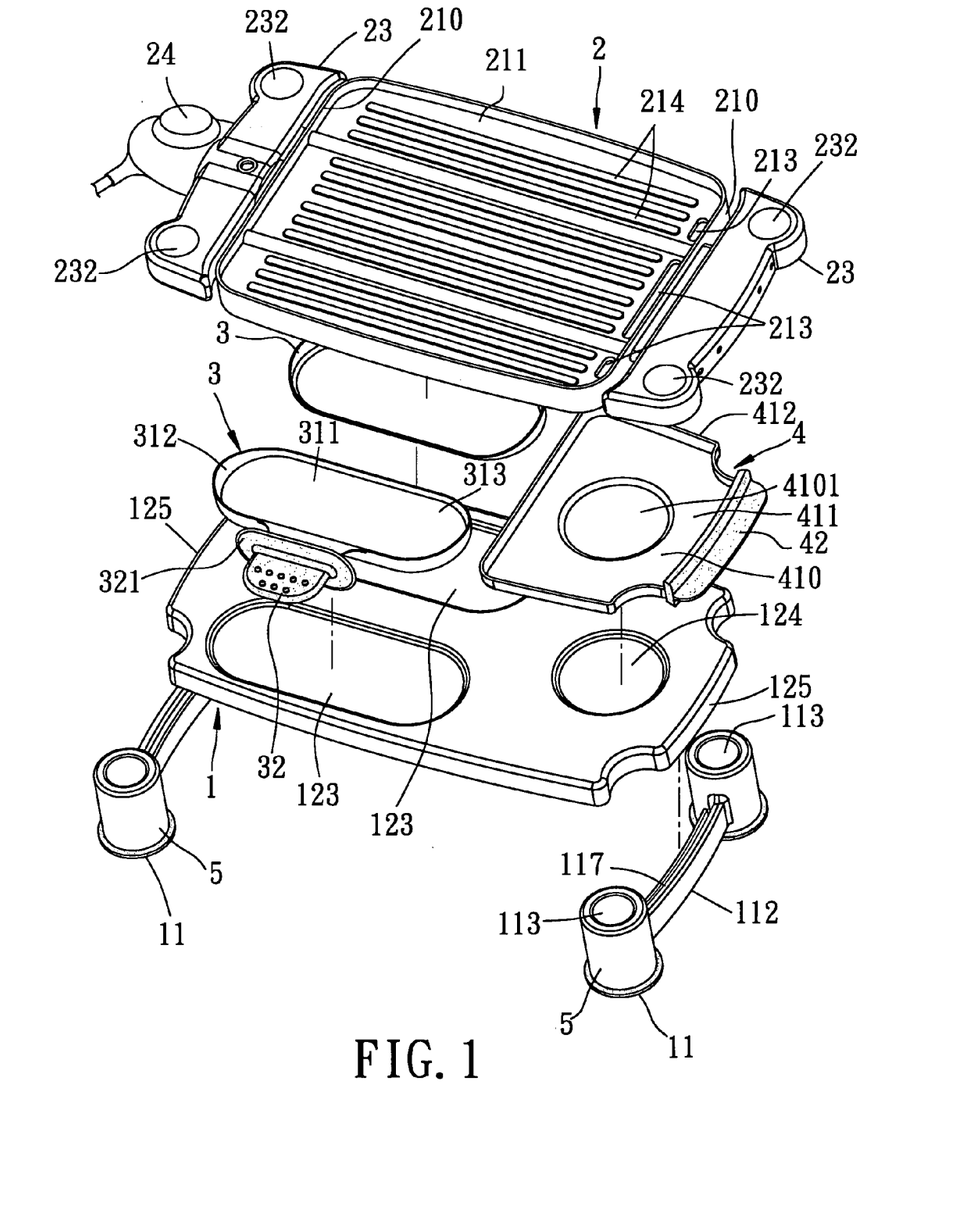
FIG. 1 is an exploded perspective view of the first preferred embodiment of a cooking device according to the present invention.
Figure 2:
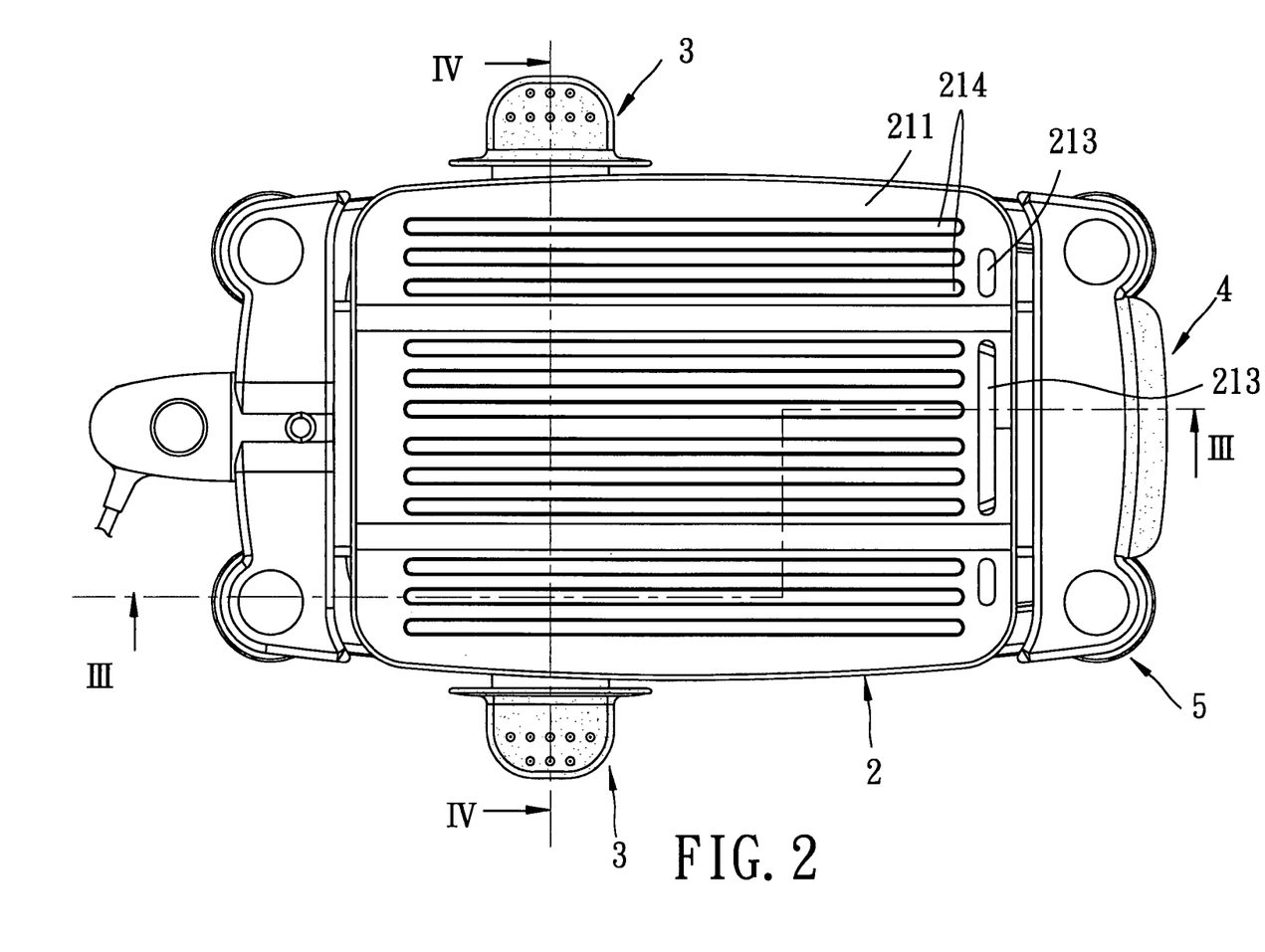
FIG. 2 is a top view of the first embodiment.
Figure 3:
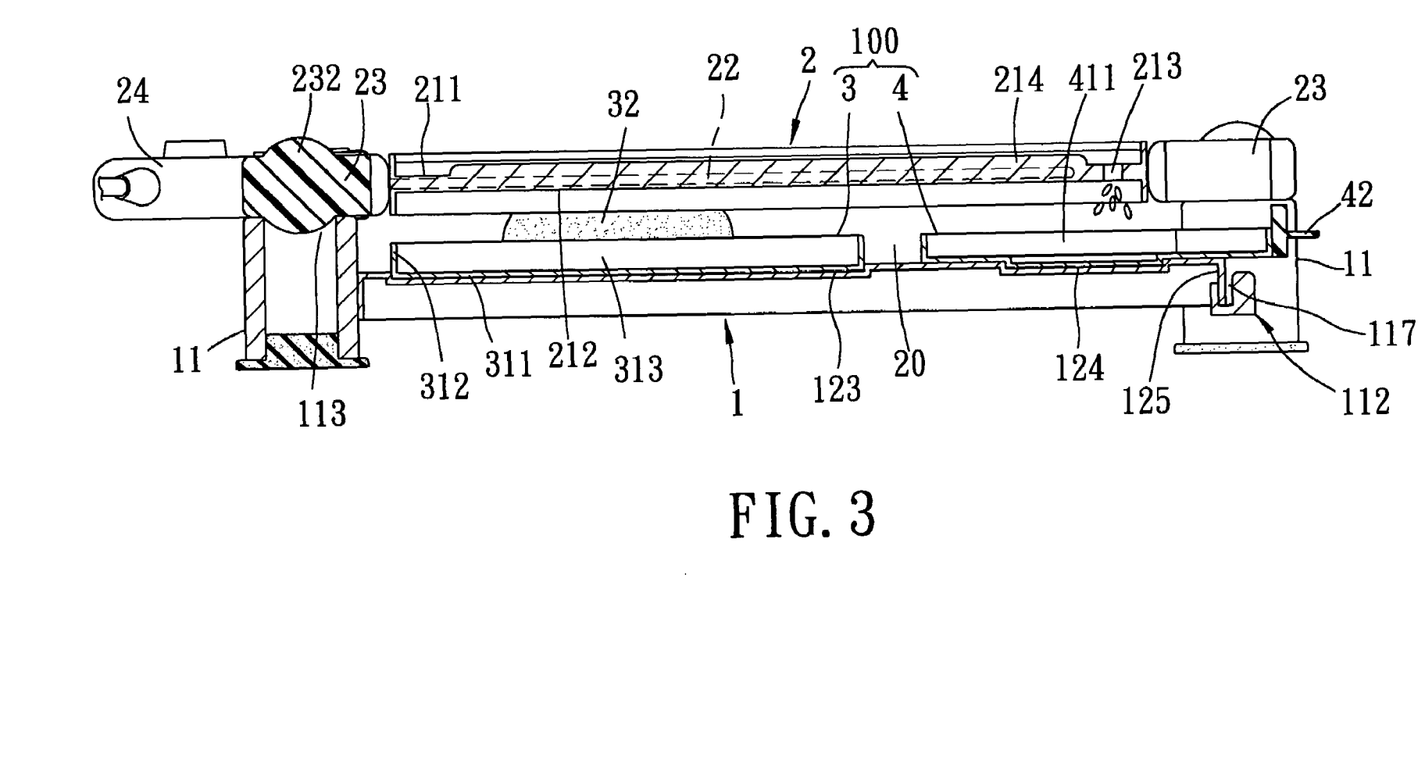
FIG. 3 is a sectional view taken along lines III—III in FIG. 2.
Figure 4:
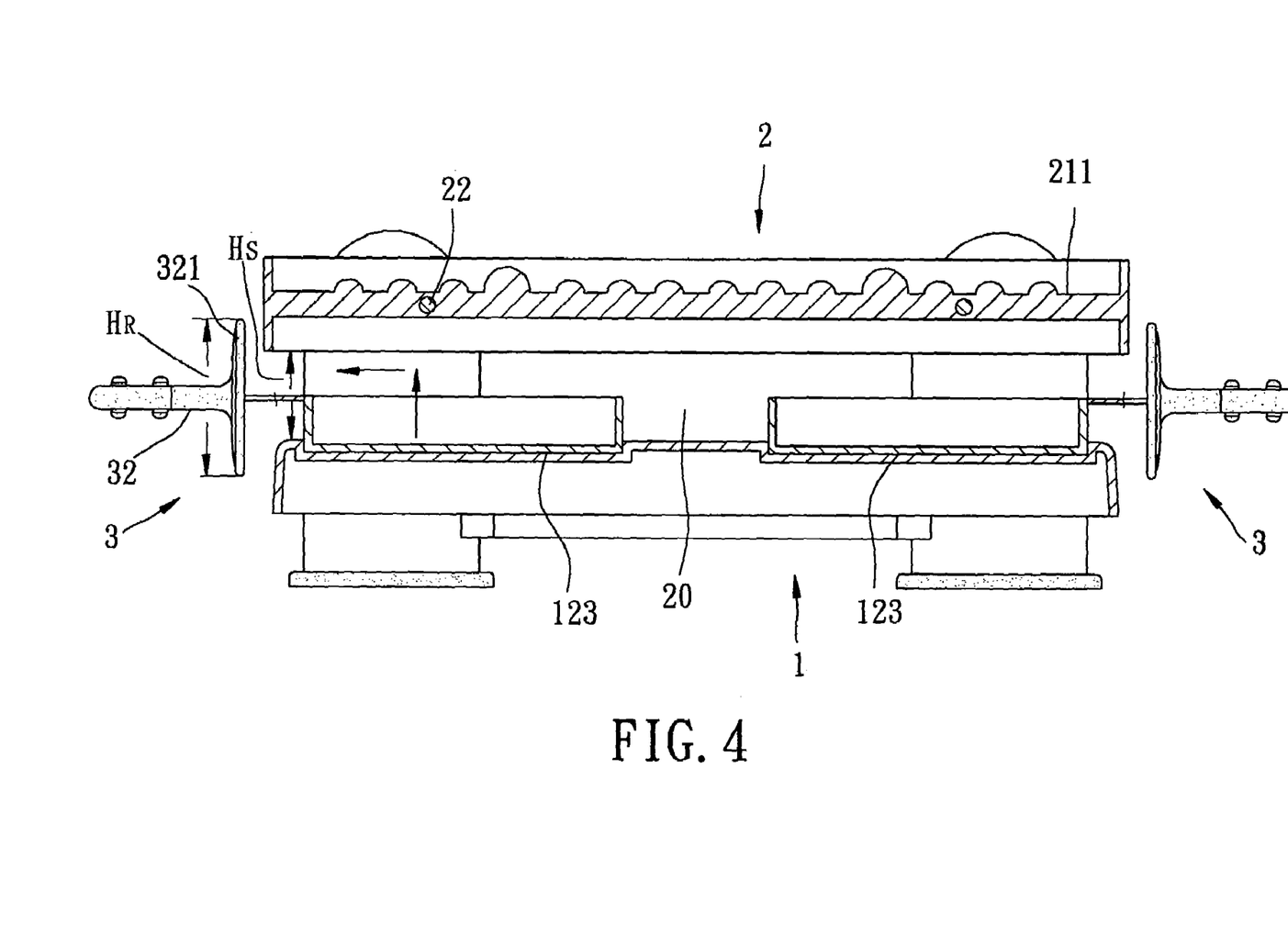
FIG. 4 is a sectional view taken along lines IV–VI in FIG. 2.
Figure 5:
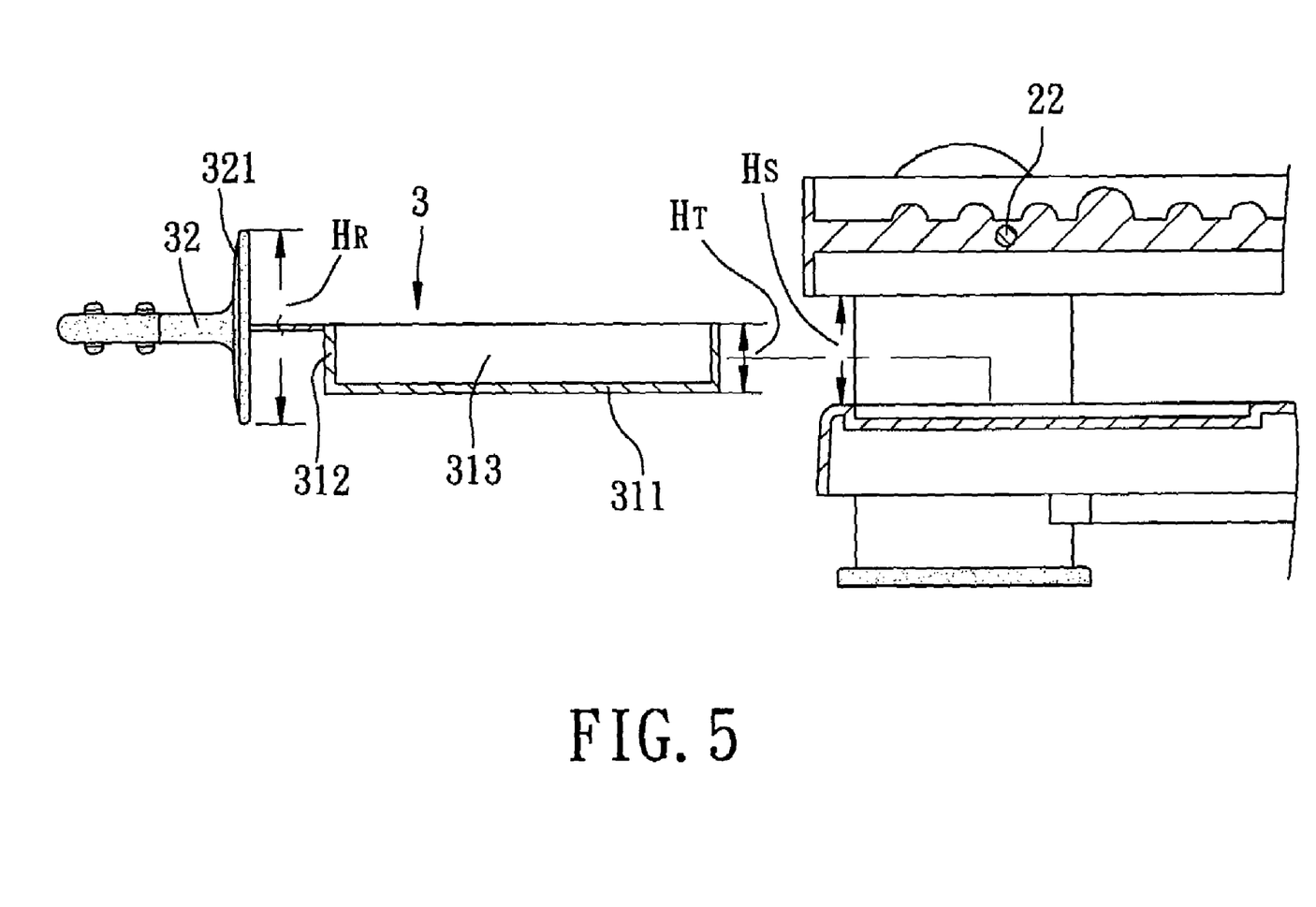
FIG. 5 is a fragmentary sectional view to illustrate how a food tray is removed from a warming compartment in the cooking device of the first embodiment.

In this embodiment, the partition unit 100 is drawable from the receiving space 20, and includes at least a food tray 3 and an oil-receiving tray 4, each of which has a base wall 311 (410) and a peripheral wall 312 (412) extending transversely from the base wall 311 (410) to confine a respective one of the warming compartment 313 and the oil compartment 411.

The base plate 1 is formed with at least a first retaining recess 123 that receives fittingly the base wall 311 of the food tray 3, and a second retaining recess 124. The base wall 410 of the oil-receiving tray 4 has a central portion 4101 that protrudes outwardly and transversely therefrom and that is received fittingly in the second retaining recess 124 in the base plate 1.

Each of the food tray 3 and the oil-receiving tray 4 is formed with a handle 32 (42) that extends outwardly of the receiving space 20 therefrom.

The cooking plate 2 defines a cooking surface 211. The base plate 1 and the cooking plate 2 are supported by a stand 5 that includes a plurality of posts 11, each of which is connected to and extends from the base plate 1 in a transverse direction relative to the cooking surface 211, and each of which has a top end face formed with a retaining groove 113. The cooking plate 2 has two opposite ends 210 and two opposite lugs 23 extending oppositely and respectively from the ends 210. Each of the lugs 23 is formed with a plurality of retaining protrusions 232 that protrude therefrom in the transverse direction and that extend into and that engage the retaining grooves 113 in the respective ones of the posts 11 so as to be supported by the stand 5.

The base plate 1 has two opposite end walls 125 that extend in a transverse direction relative to the cooking surface 211. The stand 5 further includes two opposite U-shaped connecting bars 112, each of which interconnects an adjacent pair of the posts 11 and each of which defines an elongated retaining trough 117. The end walls 125 of the base plate 1 extend into and engage respectively the retaining troughs 117 in the connecting bars 112 so as to be supported by the stand 5.

The receiving space 20 defines a space height ($H_S$) (see FIG. 5) extending from a top end face of the base plate 1 to a bottom end face of the cooking plate 2. The peripheral wall 312 (412) of each of the food tray 3 and the oil-receiving tray 4 has a top end. The base wall 311 (410) of each of the food tray 3 and the oil-receiving tray 4 has a bottom end. Each of the food tray 3 and the oil-receiving tray 4 defines a tray height ($H_T$) extending from the bottom end of the base wall 311 (410) to the top end of the peripheral wall 312 (412). The space height ($H_S$) is larger than the tray height ($H_T$) so as to permit removal of the food tray 3 and the oil-receiving tray 4 from the base plate 1 (see FIG. 5).

The handle 32 of the food tray 3 is formed with a stopper 321 that extends in the transverse direction, that is disposed outwardly of the receiving space 20, and that has a height ($H_R$) (see FIGS. 4 and 5) that is larger than the space height ($H_S$) of the receiving space 20 so as to prevent the handle 32 from extending fully and undesirably into the receiving space 20.

The cooking plate 2 has a heating member 22 embedded therein. An electrical connector 24 is mounted on one of the lugs 23, and is electrically connected to the heating member 22. The cooking surface 211 of the cooking plate 2 is formed with a plurality of ribs 214 that project from the cooking surface 211 in the transverse direction.

Figure 6:
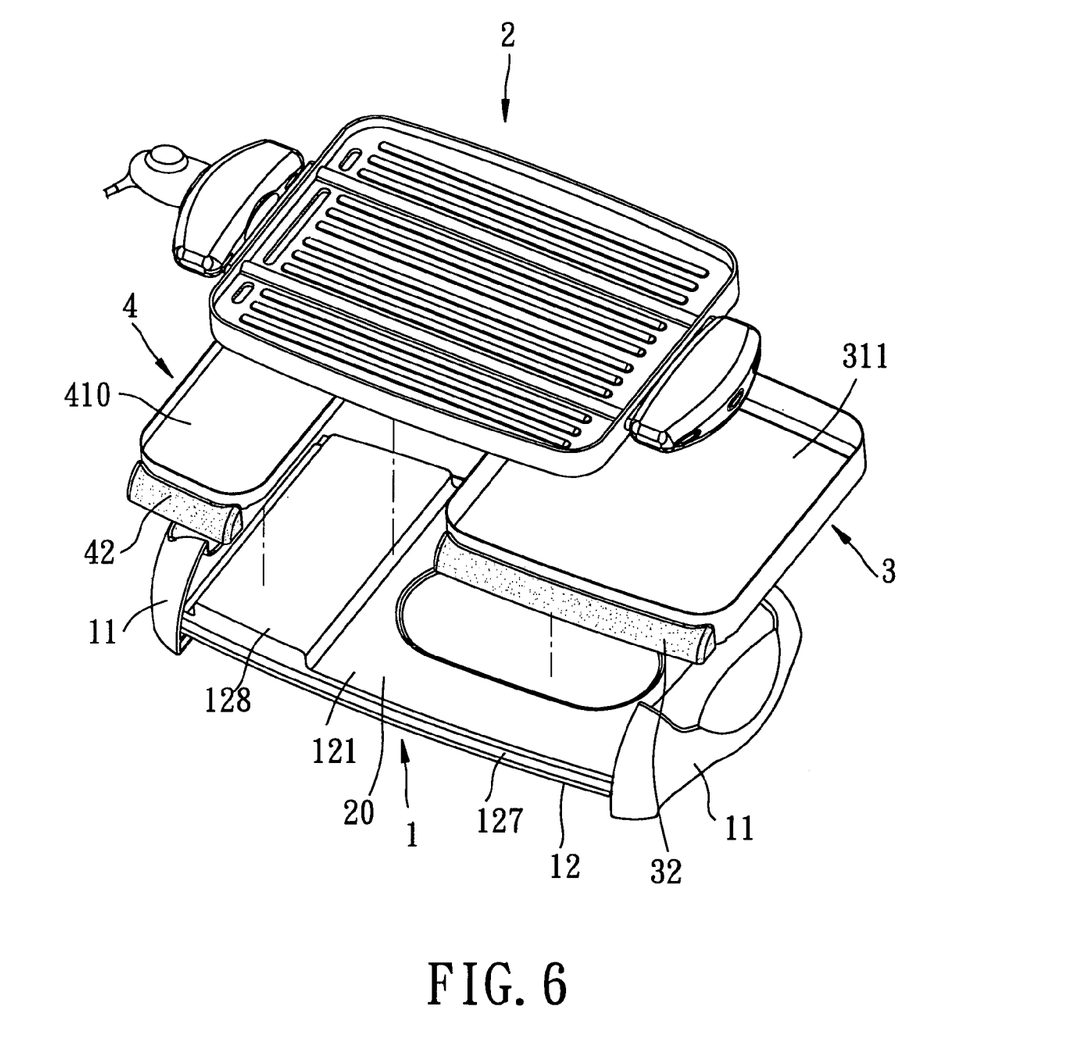
FIG. 6 is an exploded perspective view of the second preferred embodiment of the cooking device according to the present invention.
Figure 7:
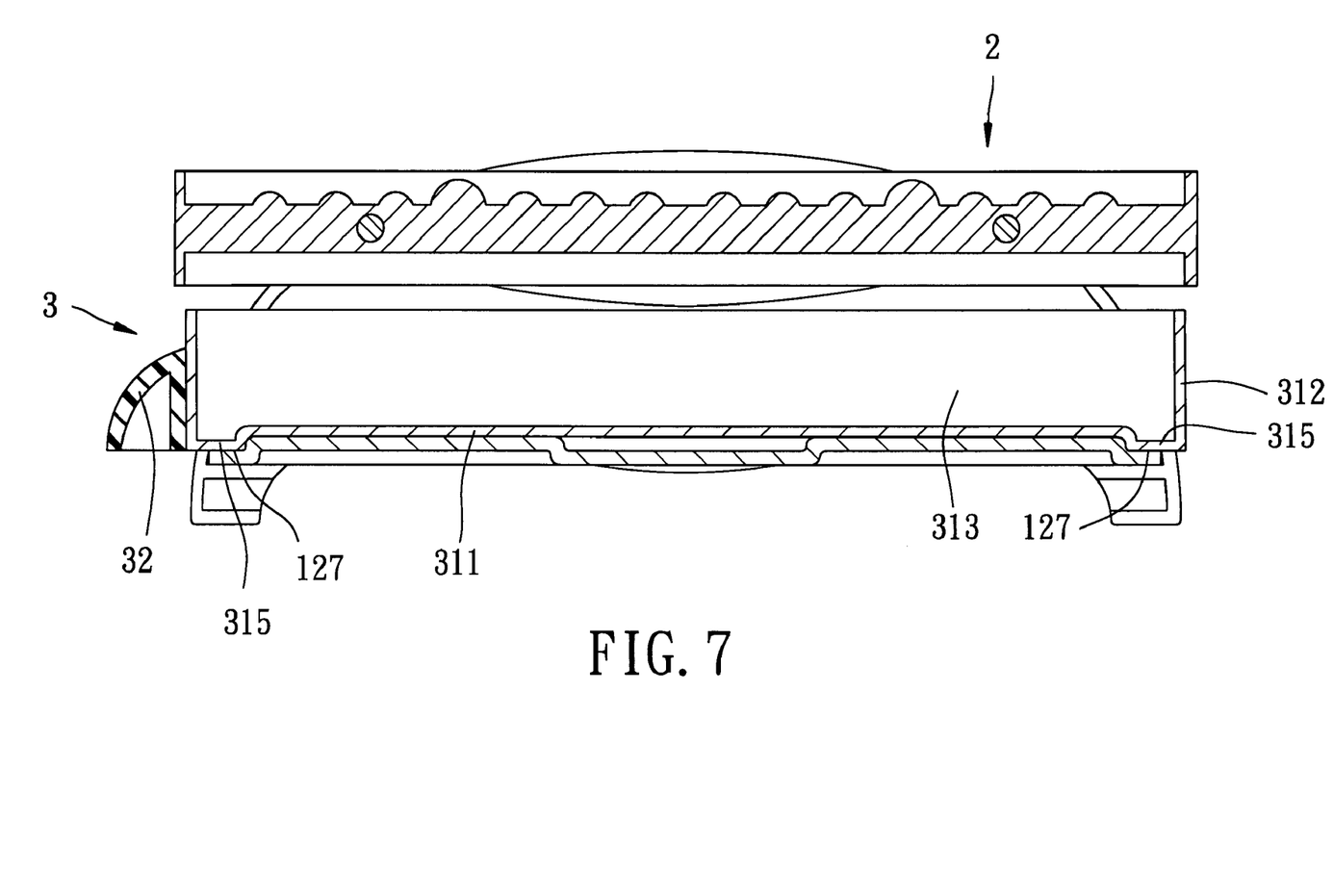
FIG. 7 is a sectional view to illustrate how a food tray is mounted on a base plate of the cooking device of the second embodiment.
Figure 8:
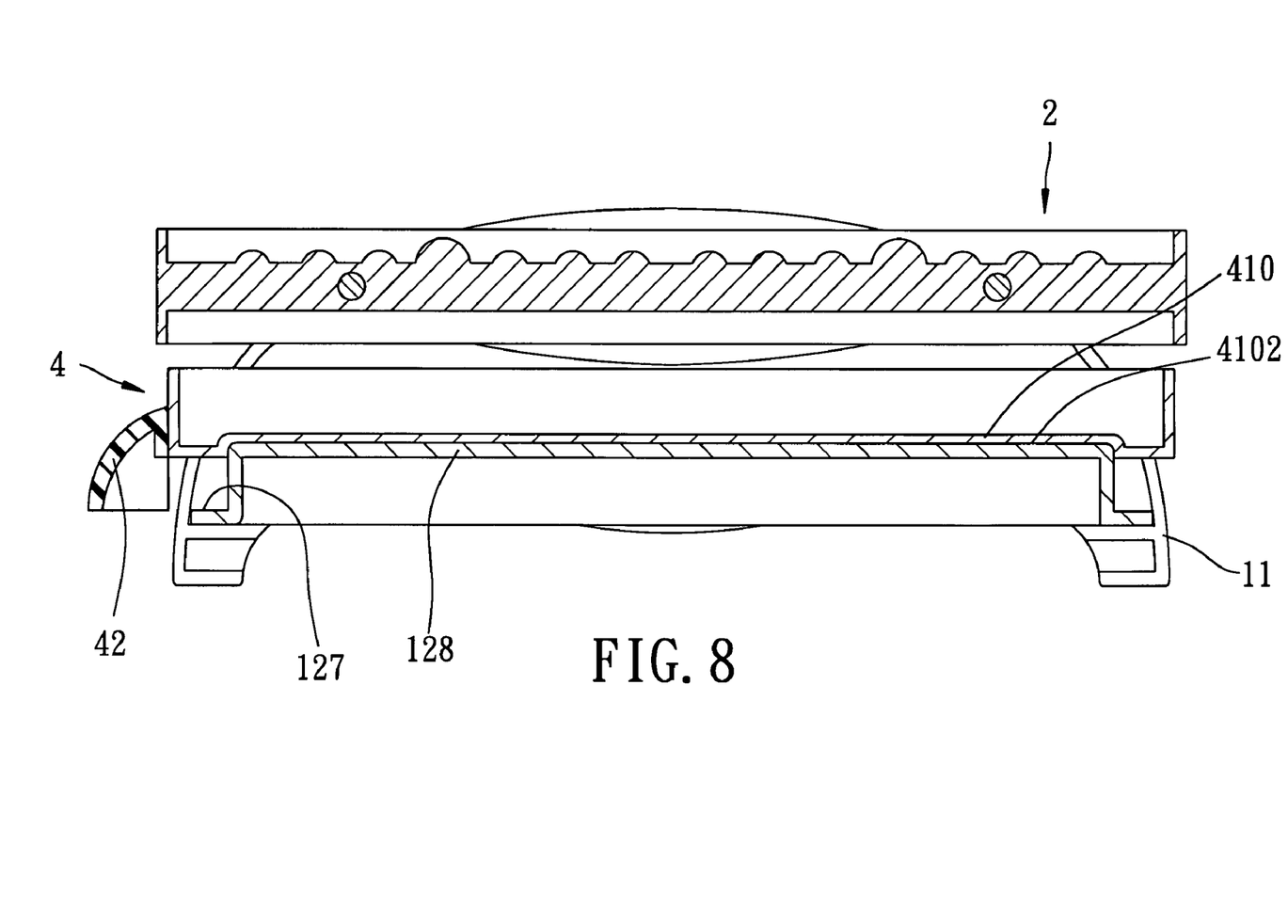
FIG. 8 is a sectional view to illustrate how an oil-receiving tray is mounted on the base plate of the cooking device of the second embodiment.

FIGS. 6 to 8 illustrate the second preferred embodiment of the cooking device according to the present invention. The cooking device of this embodiment is similar to the previous embodiment, except that the base plate 1 has two opposite sides, each of which is formed with a shoulder 127, that the base wall 311 of the food tray 3 having two opposite sides, each of which is formed with a step 315 that is seated on the shoulder 127 of a respective one of the sides of the base plate 1, and that the base plate 1 is formed with a stage 128 which extends between the sides of the base plate 1, which projects therefrom into the receiving space 20 in the transverse direction and which cooperates with the base plate 1 to define a mounting recess 121 therebetween for receiving fittingly the base wall 311 of the food tray 3. The base wall 410 of the oil-receiving tray 4 has a bottom end which is formed with a tray retaining recess 4102 for receiving fittingly a top end of the stage 128 of the base plate 1.

With the inclusion of the partition unit in the cooking device of the present invention, the aforesaid drawback of the prior art can be eliminated.

With the invention thus explained, it is apparent that various modifications and variations can be made without departing from the spirit of the present invention.

We claim:

1. A cooking device, comprising:
   a base plate;
   a cooking plate mounted on and cooperating with said base plate to define a receiving space therebetween and formed with at least a drain hole in fluid communication with said receiving space; and
   a partition unit mounted on said base plate within said receiving space and dividing said receiving space into a warming compartment that is adapted to receive food therein so as to warm the food during cooking, and an oil compartment that is isolated from said warming compartment and that is adapted to receive oil, which is formed on said cooking plate as a result of cooking and which is drained through said drain hole in said cooking plate;
   wherein said partition unit is drawable from said receiving space and includes a food tray and an oil-receiving tray, each of which has a base wall and a peripheral wall extending transversely from said base wall to confine a respective one of said warming compartment and said oil compartment; and
   wherein said food tray is formed with a handle that extends outwardly of said receiving space therefrom.

2. The cooking device of claim 1, wherein said base plate is formed with a retaining recess that receives fittingly said base wall of said food tray.

3. The cooking device of claim 1, wherein said base wall of said oil-receiving tray has a central portion that protrudes outwardly and transversely therefrom, said base plate being formed with a retaining recess that receives fittingly said central portion of said base wall of said oil-receiving tray.

4. The cooking device of claim 3, wherein said oil-receiving tray is formed with a handle that extends outwardly of said receiving space therefrom.

5. The cooking device of claim 1, wherein said cooking plate has a heating member embedded therein.

6. The cooking device of claim 1, wherein said cooking plate defines a cooking surface and is formed with a plurality of ribs that project from said cooking surface in said transverse direction.

7. The cooking device of claim 1, wherein said base plate has two opposite sides, each of which is formed with a shoulder, said base wall of said food tray having two opposite sides, each of which is formed with a step that is seated on said shoulder of a respective one of said sides of said base plate.

8. The cooking device of claim 1, wherein said cooking plate defines a cooking surface, said base plate being formed with a stage that projects therefrom into said receiving space in a transverse direction relative to said cooking surface and that cooperates with said base plate to define a mounting recess therebetween for receiving said base wall of said food tray, said base wall of said oil-receiving tray having a bottom end that is formed with a tray retaining recess, said stage having a top end that is received fittingly in said tray retaining recess in said bottom end of said base wall of said oil-receiving tray.

9. A cooking device, comprising:
   a base plate;
   a cooking plate mounted on and cooperating with said base plate to define a receiving space therebetween and formed with at least a drain hole in fluid communication with said receiving space; and
   a partition unit mounted on said base plate within said receiving space and dividing said receiving space into a warming compartment that is adapted to receive food therein so as to warm the food during cooking, and an oil compartment that is isolated from said warming compartment and that is adapted to receive oil, which is formed on said cooking plate as a result of cooking and which is drained through said drain hole in said cooking plate;
   wherein said cooking plate defines a cooking surface, said cooking device further comprising a stand including a plurality of posts, each of which is connected to and extends from said base plate in a transverse direction relative to said cooking surface, and each of which has a top end face formed with a retaining groove, said cooking plate having two opposite ends and two opposite lugs extending oppositely and respectively from said ends, each of said lugs being formed with a plurality of retaining protrusions that protrude therefrom in said transverse direction and that extend into and that engage said retaining grooves in the respective ones of said posts.

10. A cooking device, comprising:
    a base plate;
    a cooking plate mounted on and cooperating with said base plate to define a receiving space therebetween and formed with at least a drain hole in fluid communication with said receiving space; and a partition unit mounted on said base plate within said receiving space and dividing said receiving space into a warming compartment that is adapted to receive food therein so as to warm the food during cooking, and an oil compartment that is isolated from said warming compartment and that is adapted to receive oil, which is formed on said cooking plate as a result of cooking and which is drained through said drain hole in said cooking plate;

wherein said cooking plate defines a cooking surface, said base plate having two opposite end walls that extend in a transverse direction relative to said cooking surface, said cooking device further comprising a stand including a plurality of posts that are connected to said base plate and that extend in said transverse direction, and two opposite U-shaped connecting bars, each of which interconnects an adjacent pair of said posts and each of which defines an elongated retaining trough, said end walls of said base plate extending into and engaging respectively said troughs in said connecting bars.

11. A cooking device, comprising:

a base plate;

a cooking plate mounted on and cooperating with said base plate to define a receiving space therebetween and formed with at least a drain hole in fluid communication with said receiving space; and a partition unit mounted on said base plate within said receiving space and dividing said receiving space into a warming compartment that is adapted to receive food therein so as to warm the food during cooking, and an oil compartment that is isolated from said warming compartment and that is adapted to receive oil, which is formed on said cooking plate as a result of cooking and which is drained said drain hole in said cooking plate;

wherein said receiving space defines a space height extending from said base plate to said cooking plate, said peripheral wall of each of said food tray and said oil-receiving tray having a top end, said base wall of each of said food tray and oil-receiving tray having a bottom end, each of said food tray and said oil-receiving tray defining a tray height extending from said bottom end of said base wall to said top end of said peripheral wall, said space height being larger than said tray height so as to permit removal of said food tray and said oil-receiving tray from said base plate; and wherein said base plate is formed with a retaining recess that receives fittingly said base wall of said food tray, said food tray being formed with a handle that extends outwardly of said receiving space, said handle being formed with a stopper that extends in said transverse direction, that is disposed outwardly of said receiving space, and that has a height larger than said space height of said receiving space so as to prevent said handle from extending fully and undesirably into said receiving space.

\* \* \* \* \*